(12) United States Patent
Bastide et al.

(10) Patent No.: US 9,721,143 B2
(45) Date of Patent: Aug. 1, 2017

(54) MODIFICATION OF VISUAL DEPICTIONS

(71) Applicant: International Business Machines Corporation, Armonk, NY (US)

(72) Inventors: Paul R. Bastide, Boxford, MA (US); Lisa Seacat DeLuca, Baltimore, MD (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 14/221,323

(22) Filed: Mar. 21, 2014

(65) Prior Publication Data
US 2015/0269416 A1    Sep. 24, 2015

(51) Int. Cl.
  *G06K 9/00*   (2006.01)
(52) U.S. Cl.
  CPC ..... *G06K 9/00221* (2013.01); *G06K 9/00677* (2013.01); *G06K 2009/00328* (2013.01)
(58) Field of Classification Search
  CPC ........... G06K 9/00221; G06K 9/00677; G06K 2009/00328
  See application file for complete search history.

(56) References Cited

U.S. PATENT DOCUMENTS

| | | | |
|---|---|---|---|
| 6,734,858 B2 | 5/2004 | Attar et al. | |
| 6,922,201 B2 | 7/2005 | Blish et al. | |
| 6,947,593 B2 | 9/2005 | Jia et al. | |
| 8,412,780 B2 * | 4/2013 | Fox | G06Q 10/00 707/784 |
| 8,644,563 B2 * | 2/2014 | Akbarzadeh | G06K 9/00288 382/118 |
| 8,700,540 B1 * | 4/2014 | Zambrano | G06Q 50/01 705/319 |

(Continued)

OTHER PUBLICATIONS

Boyd, "Faceted ID/Entity: Managing representation in a digital world", A.B. Computer Science, Brown University 2001, Submitted to the Program in Media Arts and Sciences School of Architecture and Planning in partial fulfillment of the requirements for the degree of Master of Science in Media Arts and Sciences at the Massachusetts Institute of Technology, Sep. 2002, © Massachusetts Institute of Technology 2002, pp. 1-118.

(Continued)

*Primary Examiner* — Kim Vu
*Assistant Examiner* — Pinalben Patel
(74) *Attorney, Agent, or Firm* — Edward J. Wixted, III (57) ABSTRACT

Modifying a visual depiction is provided. A processor identifies a first depiction of a first member of an online social network. The processor determines a first date value representing a date corresponding to the first depiction. The processor determines a relationship between the first member and a second member of the online social network. The processor identifies a second date value based, at least in part, on the relationship between the first member and the second member. The processor determines a region of the first depiction by performing facial recognition based, at least in part, on the first depiction. The processor generates a second depiction by applying one or more operations to the region of the first depiction based, at least in part, on the second date value, wherein the second depiction allows identification of the first member based, at least in part, on the second date value.

14 Claims, 3 Drawing Sheets

(56) References Cited

U.S. PATENT DOCUMENTS

| | | | |
|---|---|---|---|
| 9,210,313 B1* | 12/2015 | Svendsen | G06F 17/30244 |
| 2003/0103061 A1* | 6/2003 | Blish | G09F 19/14 |
| | | | 345/619 |
| 2003/0222891 A1 | 12/2003 | Okamoto | |
| 2006/0245624 A1 | 11/2006 | Gallagher et al. | |
| 2008/0080745 A1* | 4/2008 | Vanhoucke | G06F 17/30253 |
| | | | 382/118 |
| 2009/0292549 A1* | 11/2009 | Ma | G06K 9/00335 |
| | | | 705/319 |
| 2010/0215289 A1 | 8/2010 | Pradeep et al. | |
| 2011/0182485 A1* | 7/2011 | Shochat | G06K 9/00221 |
| | | | 382/118 |
| 2011/0282838 A1 | 11/2011 | Accapadi et al. | |
| 2012/0096356 A1* | 4/2012 | Ubillos | G11B 27/034 |
| | | | 715/723 |
| 2012/0213420 A1* | 8/2012 | Steiner | G06K 9/00295 |
| | | | 382/118 |
| 2013/0254303 A1* | 9/2013 | Cheng | H04L 51/32 |
| | | | 709/206 |
| 2013/0262588 A1* | 10/2013 | Barak | H04L 67/22 |
| | | | 709/204 |
| 2013/0336543 A1* | 12/2013 | Bennett | G06K 9/6267 |
| | | | 382/112 |
| 2014/0195609 A1* | 7/2014 | Wise | G06K 9/00288 |
| | | | 709/204 |
| 2015/0242967 A1* | 8/2015 | Shsh | G06Q 10/105 |
| | | | 705/319 |
| 2015/0319256 A1* | 11/2015 | Casey | G06Q 50/26 |
| | | | 709/204 |
| 2016/0292493 A1* | 10/2016 | Gao | G06K 9/00221 |

OTHER PUBLICATIONS

"face of the future", computer science @ university of st andrews, Face Transformer Image Upload, provided in post disclosure on Dec. 9, 2013, <http://morph.cs.st-andrews.ac.uk/morph/Transformer/>.

"Lenticular printing", Wikipedia, the free encyclopedia, this page last modified on Aug. 17, 2013, <http://en.wikipedia.org/wiki/Lenticular_printing>.

"List of social networking websites", Wikipedia, the free encyclopedia, this page last modified on Nov. 28, 2013, <http://en.wikipedia.org/wiki/List_of_social_networking_websites>.

"perception lab", provided in post disclosure on Dec. 9, 2013, <http://web.archive.org/web/20140209040944/http://morph.cs.st-andrews.ac.uk/>.

Bakke, "Aging Your Digital Pictures: There Is a Patent for That", in Business on Nov. 22, copyright 2010 ConceivablyTech, <http://web.archive.org/web/20120718064335/http://www.conceivablytech.com/9886/business/aging-your-digital-pictures-there-is-a-patent-for-that>.

\* cited by examiner

MODIFICATION OF VISUAL DEPICTIONS

TECHNICAL FIELD

The present disclosure relates generally to the field of image processing, and more particularly to modification of visual depictions.

BACKGROUND

An online social network (OSN) is a platform to build social networks or social relations among members of the OSN who, for example, share interests, activities, backgrounds, or real-life connections. An OSN typically allows members to create a profile, share information with other members, and form connections with other members. The profile or information of a member may include depictions, representations, or images that depict the member. An OSN may be an internet-based service accessible to members who are physically located in diverse and potentially distant geographic locations.

Image processing is any form of signal processing for which the input is an image, such as a photograph or video frame; the output of image processing may be a processed image. Digital image processing is the use of computer algorithms to perform image processing on digital images. The computer algorithms may manipulate myriad aspects of the digital image, such as adjusting colors, contrast, white balance, or sharpness, for example.

SUMMARY

Embodiments of the present approach relate to modifying a visual depiction. An online social network has a first member with a first depiction. The first depiction has a corresponding date. A second date is determined, based on a relationship between the first member and a second member of the online social network. A second depiction is generated by applying operations to a region of the first depiction. The second depiction allows identification of the first member based on the second date value.

A first aspect of the present approach provides a computer-implemented method for modifying a visual depiction. A processor identifies a first depiction of a first member of an online social network. The processor determines a first date value representing a date corresponding to the first depiction. The processor determines a relationship between the first member and a second member of the online social network. The processor identifies a second date value based, at least in part, on the relationship between the first member and the second member. The processor determines a region of the first depiction by performing facial recognition based, at least in part, on the first depiction. The processor generates a second depiction by applying one or more operations to the region of the first depiction based, at least in part, on the second date value, wherein the second depiction allows identification of the first member based, at least in part, on the second date value.

A second aspect of the present approach provides a system for modifying a visual depiction in a computer system environment that includes a processor in communication with a memory and is configured to perform a method. The processor identifies a first depiction of a first member of an online social network. The processor determines a first date value representing a date corresponding to the first depiction. The processor determines a relationship between the first member and a second member of the online social network. The processor identifies a second date value based, at least in part, on the relationship between the first member and the second member. The processor determines a region of the first depiction by performing facial recognition based, at least in part, on the first depiction. The processor generates a second depiction by applying one or more operations to the region of the first depiction based, at least in part, on the second date value, wherein the second depiction allows identification of the first member based, at least in part, on the second date value.

A third aspect of the present approach provides a computer program product for modifying a visual depiction. The computer program product includes a computer readable storage medium having program instructions embodied therewith. The program instructions are executable by a processor to cause the processor to perform a method. The processor identifies a first depiction of a first member of an online social network. The processor determines a first date value representing a date corresponding to the first depiction. The processor determines a relationship between the first member and a second member of the online social network. The processor identifies a second date value based, at least in part, on the relationship between the first member and the second member. The processor determines a region of the first depiction by performing facial recognition based, at least in part, on the first depiction. The processor generates a second depiction by applying one or more operations to the region of the first depiction based, at least in part, on the second date value, wherein the second depiction allows identification of the first member based, at least in part, on the second date value.

A fourth aspect of the present approach provides a method for deploying a system for modifying a visual depiction in a computer system environment, comprising: providing a computer infrastructure being operable to: identify, in a computer memory medium, a first depiction of a first member of an online social network; determine a first date value representing a date corresponding to the first depiction; determine a relationship between the first member and a second member of the online social network; identify a second date value based, at least in part, on the relationship between the first member and the second member; determine a region of the first depiction by performing facial recognition based, at least in part, on the first depiction; generate a second depiction by applying one or more operations to the region of the first depiction based, at least in part, on the second date value, wherein the second depiction allows identification of the first member based, at least in part, on the second date value.

DETAILED DESCRIPTION

Embodiments of the present invention recognize that members of an online social network (OSN) may provide visual depictions of themselves and may share the depictions with other members of the OSN. Further recognized is that each depiction may correspond to a different point in time. Further recognized is that the appearance of an individual changes over time, so two members of an OSN who were once well acquainted may no longer recognize one another based on recent depictions of the members.

Embodiments of the present invention provide for modifying a visual depiction. One such embodiment provides that the depiction of a member may be modified based on a connection date of the member and another member.

Figure 1:
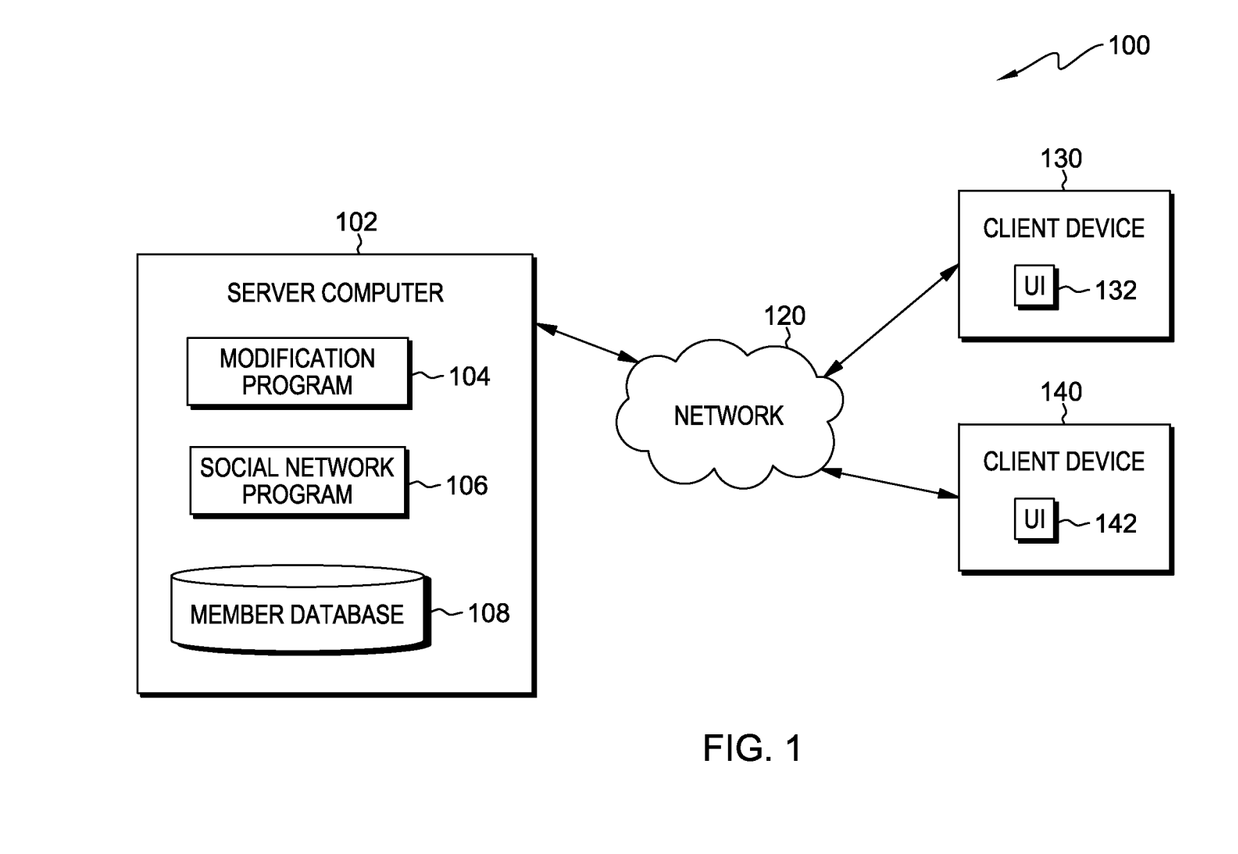
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, generally designated 100, in accordance with one embodiment of the present disclosure. Computing environment 100 includes server computer 102 and client devices 130 and 140 connected over network 120.

In various embodiments of the present disclosure, client devices 130 and 140 can each respectively be a laptop computer, a tablet computer, a netbook computer, a personal computer (PC), a desktop computer, a personal digital assistant (PDA), a smart phone, or any programmable electronic device capable of communicating with one another and/or server computer 102 via network 120. Client device 130 includes user interface (UI) 132, which executes locally on client device 130. Client device 140 includes UI 142, which executes locally on client device 140. UI 132 and UI 142 each operate to provide a user interface (UI) to a user of each of client devices 130 and 140, respectively. UI 132 and 142 can each present information and receive user input. For example, UI 132 and 142 can each receive user input (e.g., a user interaction) from a user of client devices 130 and 140, respectively, in response to presenting a prompt to the user. The user input may include a depiction, a search query, or other data.

Server computer 102 includes modification program 104, social network program 106, and member database 108. Client device 130 includes user interface (UI) 132. In various embodiments of the present invention, server computer 102 is a computing device that can be a standalone device, a server, a laptop computer, a tablet computer, a netbook computer, a personal computer (PC), or a desktop computer. In another embodiment, server computer 102 represents a computing system utilizing clustered computers and components to act as a single pool of seamless resources. In general, server computer 102 can be any computing device or a combination of devices with access to some or all of client devices 130 and 140, and with access to and/or capable of executing some or all of modification program 104, social network program 106, member database 108, UI 132, and UI 134. Server computer 102 may include internal and external hardware components, as depicted and described in further detail with respect to FIG. 3.

In this exemplary embodiment, modification program 104, social network program 106, and member database 108 are each stored on server computer 102. However, in other embodiments, each of modification program 104, social network program 106, and member database 108 may be stored externally and accessed through a communication network, such as network 120. Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server computer 102 and client devices 130 and 140.

Social network program 106 operates to provide an online social network (OSN). The OSN may allow users to become members of the OSN. Each member may have a member profile, which may include a depiction of the member. The member profile may include member profile content, which may include, for example, an educational history, a work history, or other details provided by the member. A depiction may be a graphical image, photograph, drawing, computer-generated image, avatar, video image, animated image, or any other type of depiction that depicts an appearance of a member. The date of a depiction is the date at which the depiction depicts the appearance of the member. The date may be represented by a date value. Each member of the OSN may be depicted by one or more depictions. The one or more depictions may be associated with the member profile of the depicted member. Social network program 106 may store each member profile and each depiction to member database 108. In one embodiment, social network program 106 resides on server computer 102. In other embodiments, social network program 106 may reside on another computing device, provided that social network program 106 can access and is accessible to server computer 102, client devices 130 and 140, modification program 104, member database 108, and UI 132 and 142.

Modification program 104 operates to generate a series of depictions of a member. Modification program 104 determines a connection date between a first member of an OSN and a second member of an OSN. In one embodiment, the connection date represents the last-occurring date at which the second member would recognize the first member based on a depiction of the first member. A depiction captured contemporaneously with the connection date may allow identification of the first member by the second member. Modification program 104 may determine the connection date based on a relationship between the first member and the second member. The series of depictions may depict a gradual, chronological progression in the appearance of a member from the connection date to the date of a requested depiction. In one embodiment, modification program 104 resides on server computer 102. In other embodiments, modification program 104 may reside on another computing device, provided that modification program 104 can access and is accessible to server computer 102, client devices 130 and 140, social network program 106, member database 108, and UI 132 and 142.

Member database 108 is a data repository that may be written to and read by modification program 104 and social network program 106. Member profiles and depictions may be stored to member database 108. Member database 108 may store one or more depictions depicting one or more members of an OSN provided by social network program 106. In some embodiments, member database 108 may be written to and read by server computer 102, client device 130, client device 140, and/or programs and entities outside of computing environment 100 in order to populate the member database 108 with member profiles and depictions. In one embodiment, member database 108 resides on server computer 102. In other embodiments, member database 108 may reside on another computing device or client devices 130 or 140, provided that member database 108 is accessible to server computer 102, client devices 130 and 140, modification program 104, and social network program 106, UI 132 and UI 142.

Figure 2:
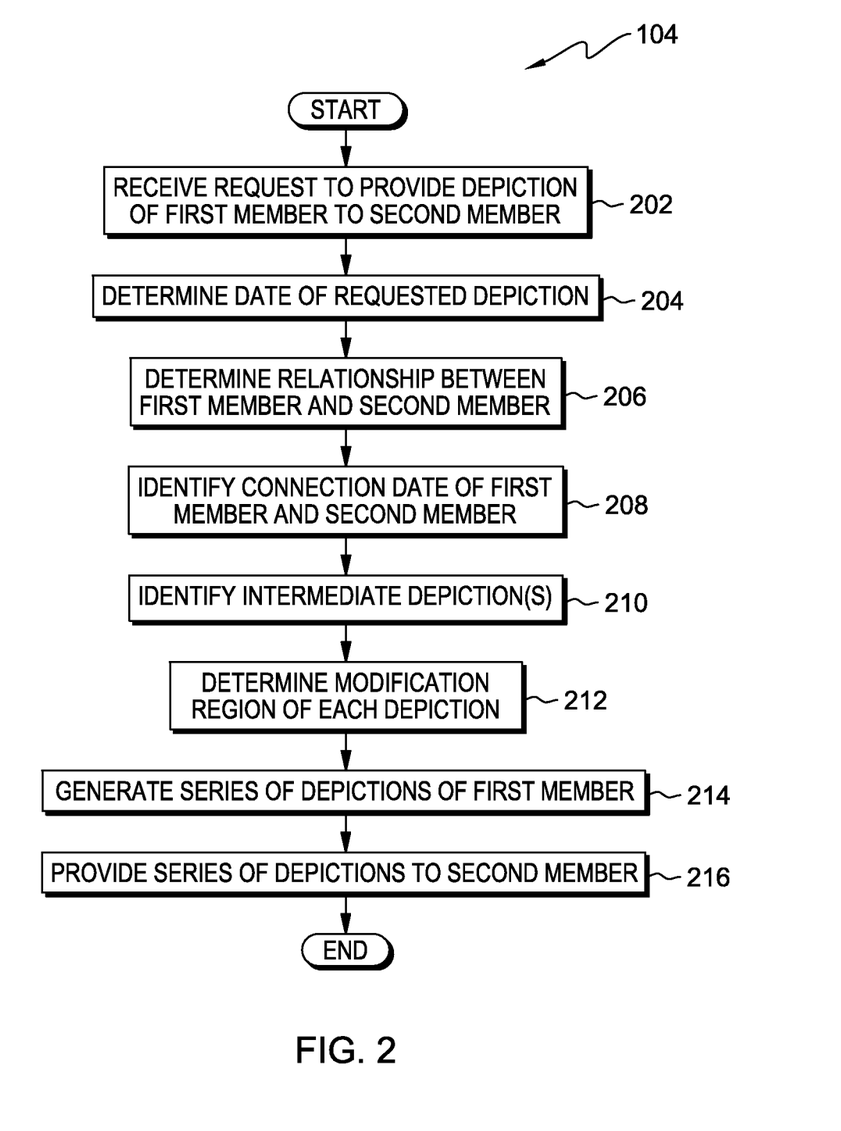
FIG. 2 is a flowchart depicting operations of a modification program, on a computing device within the computing environment of FIG. 1, in accordance with an embodiment of the present disclosure.

FIG. 2 is a flowchart depicting operations of modification program 104, on a computing device within the computing environment of FIG. 1, in accordance with an embodiment of the present disclosure.

In step 202, modification program 104 receives a request to provide a depiction of a first member to a second member. Each of the first member and the second member may be a member of an OSN. For example, the first member and the second member may both be members of an OSN provided by social network program 106. Modification program 104 may receive the request from a client device. Modification program 104 may receive the request from a client device (e.g., client device 140) in response to the client device receiving a user interaction, via a user interface (e.g., UI 142), from a user (e.g., the second user). The first member may be a user of a client device (e.g., client device 130). In various examples, the user interaction may be a search query, a connection request, a request for one or more depictions, or a member profile request. The request may identify one or more depictions of one or more members in addition to the requested depiction of the first member. The requested depiction may be a depiction of one or more depictions that depict the first member. The requested depiction may be a frame of video image or animated image, for example a user-selected frame.

In some embodiments, social networking program 106 provides an OSN and receives control preferences for each member of the OSN. Control preferences are settings by which a member can control the degree to which depictions or member profile content of the member is shared with other members of the OSN. For example, a member may provide control preferences that prevent other members of the OSN from viewing some or all of the depictions provided to the OSN by the first member. In such embodiments, social networking program 106 may limit the amount of access a member has to the depictions of one or more other members. Conversely, depending on the control preferences of a member of an OSN, the social networking program 106 may provide access to a depiction of the member to one or more other members of the OSN. For example, the OSN may provide a member of the OSN with access to depictions of one or more other members of the OSN in response to receiving from the member a search for the one or more other members of the OSN. Alternatively, the OSN may provide a second member access to a depiction of a first member in response to receiving a connection request from the first member identifying the second member.

In step 204, modification program 104 determines a date of the requested depiction. The requested depiction depicts an appearance of the first member as of a particular date, which is the date of the requested depiction. Modification program 104 determines the date of the requested depiction to a pre-determined degree of precision (e.g., decade, year, season, month, day, or other time interval).

In some embodiments, modification program 104 may determine the date of the requested depiction based on contextual information, such as a caption or title of the requested depiction. A caption may include a date or time frame. Alternatively, the caption may identify an event or other occurrence, based upon which modification program 104 may determine a particular date or time. For example, modification program 104 may determine a date of an event by referencing a relational database residing in member database 108 (see FIG. 1) that associates events or other occurrences with particular dates or times. Modification program 104 may determine the date of the requested depiction based on the caption and other information of the first member, such as information provided by the first member in a member profile. For example, based on the caption "senior prom" and an educational history contained in the member profile of the first member, modification program 104 may determine the date of the requested depiction to be during the spring of the year in which the member was a senior in high school. Modification program 104 may utilize various natural language processing techniques to analyze the caption and/or the member profile content.

In other embodiments, modification program 104 determines the date of the requested depiction based on metadata of the requested depiction (e.g., Exchangeable image file format (Exif) data), based on the date upon which modification program 104 receives the requested depiction, based on a date embedded within the requested depiction (e.g., a date superimposed on a portion of the depiction), based on user input (e.g., user input received in response to a user interaction with UI 132 of client device 130), or any combination thereof.

In step 206, modification program 104 determines a relationship between the first member and a second member. The relationship is a commonality between the first member and the second member that represents a foundation for a connection between the first member and the second member. The relationship may include have a start date and an end date. For example, modification program 104 may determine that two members were classmates during a particular four-year period by determining that they both attended the same school during that period. In this example, the relationship start date and end date are the dates at which the four-year period began and ended, respectively. In another example, modification program 104 may determine that a relationship between two members is that they both attended an event (e.g., a conference) on a particular date. Alternatively, the relationship between two members may be that they are connected via an OSN (e.g., an OSN provided by social network program 106). Modification program 104 may determine multiple relationships between the first member and the second member based on more than one status. For example, the members may be classmates and also co-workers. In such an example, modification program 104 may determine the start date and end date of the relationship based on the start date and end date of one status or based on a combination of the start dates and end dates of more than one status. A relationship may be on-going, in which case the end date may be the current date.

In some embodiments, modification program 104 may determine a relationship between two members based on the depictions of each member. For example, modification program 104 may determine that a relationship exists between two members based on a depiction that depicts both of the members. In some embodiments, modification program 104 may include the depiction that depictions both of the members in the series of depictions (discussed below), or may otherwise provide the depiction to one or both of the depicted members.

In step 208, modification program 104 identifies a connection date of the first member and the second member. The connection date may represent a date during a relationship between the first member and the second member, including the start date of the relationship, the end date (if any) of the relationship, or any date in between. For example, two members related by being co-workers for a particular three-month period may have a connection date representing the date the three-month period began, the date the three-month period ended, or any date in between. The connection date may be earlier than, later than, or the same as the date of the requested depiction.

In some embodiments, modification program 104 determines the connection date based on user input received from a member of the relationship. For example, modification program 104 may, via UI 142, provide a prompt such as "When did you meet?" or "When did you last see this member?" In response, modification program 104 may receive user input from a user of client device 140 that includes the connection date.

In step 210, modification program 104 identifies one or more reference depictions. Modification program 104 may identify a list of depictions of the first member, which may include the depictions of the set of depictions of the first member. Modification program 104 may determine the date of each depiction of the list utilizing any combination of the techniques described above in connection with determining the date of the requested depiction. Modification program 104 may eliminate from the list of depictions any depictions that do not have a date between the connection date and the date of the requested depiction. Alternatively, modification program 104 may eliminate from the list of depictions any depictions that do not have a date between the current date and the earlier of the connection date and the date of the requested depiction. Modification program 104 identifies the one or more reference depictions as the depictions remaining in the list of depictions. In some embodiments, modification program 104 chronologically sorts the one or more reference depictions based on the date of each reference depiction.

In step 212, modification program 104 determines a modification region of each depiction. Modification program 104 may determine a modification region of the requested depiction and any reference depictions. The modification region of a depiction of a member is the region of a depiction that depicts the face of the member. Alternatively, the modification region may be a region of a depiction that depicts one or more facial features of the depicted member. Facial features may include, for example, a nose, ears, eyes, or mouth, each of which has a shape, size, and orientation. Modification program 104 may utilize one or more facial recognition techniques to identify the modification region of each reference depiction. In some embodiments, modification program 104 discards certain depictions from the one or more reference based on determining a modification region of each. In various examples, modification program 104 discards depictions of resolution below a pre-determined threshold or depictions that do not depict the entire face of the depicted member (e.g., depictions of the member facing away from the camera). In some embodiments, modification program 104 may identify the modification region in response to receiving user input from a client device (e.g., client device 130 or 140) that identifies a region depicting the face of the depicted member.

In some embodiment, a depiction may depict multiple individuals. For example, the requested depiction may depict a group of members, including the first member. Modification program 104 may identify as the modification region of the requested depiction the region that depicts the face of the first member. For example, modification program 104 may identify the modification region based on a received user interaction, metadata of the image (e.g., a tag associated with a region of the depiction), by comparing the requested depiction to another depiction known to modification program 104 to depict the face of the first member, or any combination thereof. Alternatively, modification program 104 may identify multiple modification regions of a depiction and may apply the operations described herein to each.

In step 214, modification program 104 generates a series of depictions of the first member. The series of depictions includes a plurality of depictions. The series of depictions may depict a chronological progression of the appearance of the first member over a period of time. The chronological progression may progress forward in time or backward in time (i.e., in reverse). For example, the series of depictions may depict the appearance of the first member, starting with the requested depiction and progressing in reverse chronologically to the connection date, which is a date prior to the date of the requested depiction in this example. The period of time may start and/or end with any of the date of the requested depiction, the connection date, the current date, or another date. The series of depictions may include the requested depiction and one or more of the reference depictions in chronological order.

In one embodiment, modification program 104 generates the series of depictions by applying modification operations based on the requested depiction and the connection date to generate a series of transitional depictions that depict the chronological progression of the first member from the date of the requested depiction to the connection date. The modification operations applied may include digital image manipulation techniques that simulate changes in the appearance of the depicted member based on changes in age of the member.

In some embodiments, the series of depictions includes the requested depiction and one or more reference depictions. Modification operations may techniques may include techniques that merge the facial features of two depictions to form a transitional series of depictions. Modification program 104 may utilize such modification operations to generate one or more depictions based on the requested depiction or one of the reference depictions.

In some embodiments, the series of depictions includes one or more sub-series of depictions. Modification program 104 may generate each sub-series. Modification program 104 may chronologically sort a plurality of depictions of the first member. Modification program 104 may applying modification operations to each adjacent pair of the sorted plurality of depictions to generate a transitional series of depictions that depicts a chronological progression from one of the adjacent pair of depictions to the other. Modification program 104 may generate the series of depictions by merging together each of the generated sub-series.

In some embodiments, each depiction of the series of depictions differs from the next depiction of the series by a pre-determined amount. Modification program 104 may determine differences between depictions of the series based on differences between facial features of the depictions. For example, modification program 104 may determine a distance between an edge of a facial feature in each of a first depiction of the series and the next depiction of the series. If the distance exceeds a pre-determined threshold, modification program 104 generates a transitional depiction between the first depiction and the next depiction (e.g., by applying modification operations to the first depiction and/or the next depiction). Alternatively, the series of depictions includes a sufficient number of depictions to animate a gradual transition from one appearance to another. The number of depictions that is sufficient depends upon the degree to which the appearances differ from one another, which may be measured by comparing the positions, shapes, and sizes of facial features of one appearance to those of the other.

In some embodiments, the depictions of the series depict the appearance of the first member at regular time intervals. For example, the date of each depiction may be one month later than the date of the previous depiction of the series, so that the series of depictions depicts a chronological progression of the appearance of the first member on a month-by-month basis.

In some embodiments, a depiction of the series may identify the date of the depiction. In various examples, modification program 104 may identify the date of a depiction by superimposing the date on the depiction, by associating the depiction with metadata identifying the date, or by associating the depiction with a caption identifying the date. Modification program 104 may identify dates of depictions at regular intervals of the series of depictions. The interval may be based upon the position of the depiction within the series (e.g., every third depiction of the series), or based upon the dates (e.g., every six months of age difference). Alternatively, modification program 104 may identify at irregular intervals. For example, modification program 104 may identify dates of depictions based on dates of events, dates identified in member profile content, dates of the relationship between the first member and the second member, the connection date, the current date, the date of the requested depiction, or other dates deemed significant. Each date corresponding to a depiction may be identified with one or more depictions. For example, a date may be superimposed on a depiction of the series and gradually fade out over the next several depictions of the series.

In some embodiments, the requested depiction is a video image or animated image. The series of depictions can include some or all of the video/animated frames from the requested depiction and some or all of the depictions generated by modification program 104 applying modification operations to the requested depiction. In one such embodiment, Modification program 104 can generate a series of depictions, wherein the half of the series includes the video image of the requested depiction and the second half of the series includes depictions generated based on the frames of the video image. For example, the requested depiction may be a video clip of the first member. Modification program 104 can generate a series of depictions that includes the video clip and a generated video clip depicting a generated appearance of the first member corresponding to the connection date. The series of depictions may include the video clip and the generated video sequentially. Alternatively, the series of depictions may include the video clip and the generated video concurrently (e.g., side-by-side or split-screen). The generated video may depict a chronological progression of an appearance of the first member over the duration of the generated video. Alternatively, the generated video may depict the appearance of the first member at a date other than the date of the requested depiction (e.g., the connection date).

In step 216, modification program 104 provides the series of depictions to the second member. Modification program 104 may provide the series of depictions by providing video content, animated visual content, or a series of digital images that represents the series of depictions. For example, modification program 104 may provide a graphics interchange format (GIF) image wherein each frame of the GIF image is a depiction of the series of depictions. Modification program 104 may provide the series of depictions by sending the series of depictions to a client device (e.g., client device 140, which may present the series of depictions via UI 142).

Modification program 104 may provide each depiction of the series of depictions for an equal (or, alternatively, unequal) amount of time as each other depiction. For example, modification program 104 may provide a first depiction of the series for a longer time than one or more subsequent transitional depictions, and transitional program 104 may provide the last depiction for a period of time as long as (or longer than) the first depiction.

In some embodiments, modification program 104 presents the series of depictions in response to a user interaction received via a user interface (e.g., UI 142). For example, UI 142 may receive a user interaction from a user of client device 140 by detecting that a mouse cursor has maintained position over (or within the boundaries of) an element of UI 142 for a pre-determined period of time (sometimes known as a "hover" interaction or "hovering"). Alternatively, the interaction received may be receiving a selection input identifying an element of UI 142 (e.g., a mouse "click"). In response to the user interface receiving an interaction, the user interface may present all or part of the series of depictions. In one embodiment, the user interface presents only those portions of the series of depictions corresponding to the user interaction. The portion presented may include a portion of each depiction. For example, a user interaction received by UI 142 may identify a region of the requested depiction (e.g., a circular region within a pre-determined radius of a mouse cursor hovering over the requested depiction) such as a hover interaction over a facial feature of the requested depiction.

Figure 3:
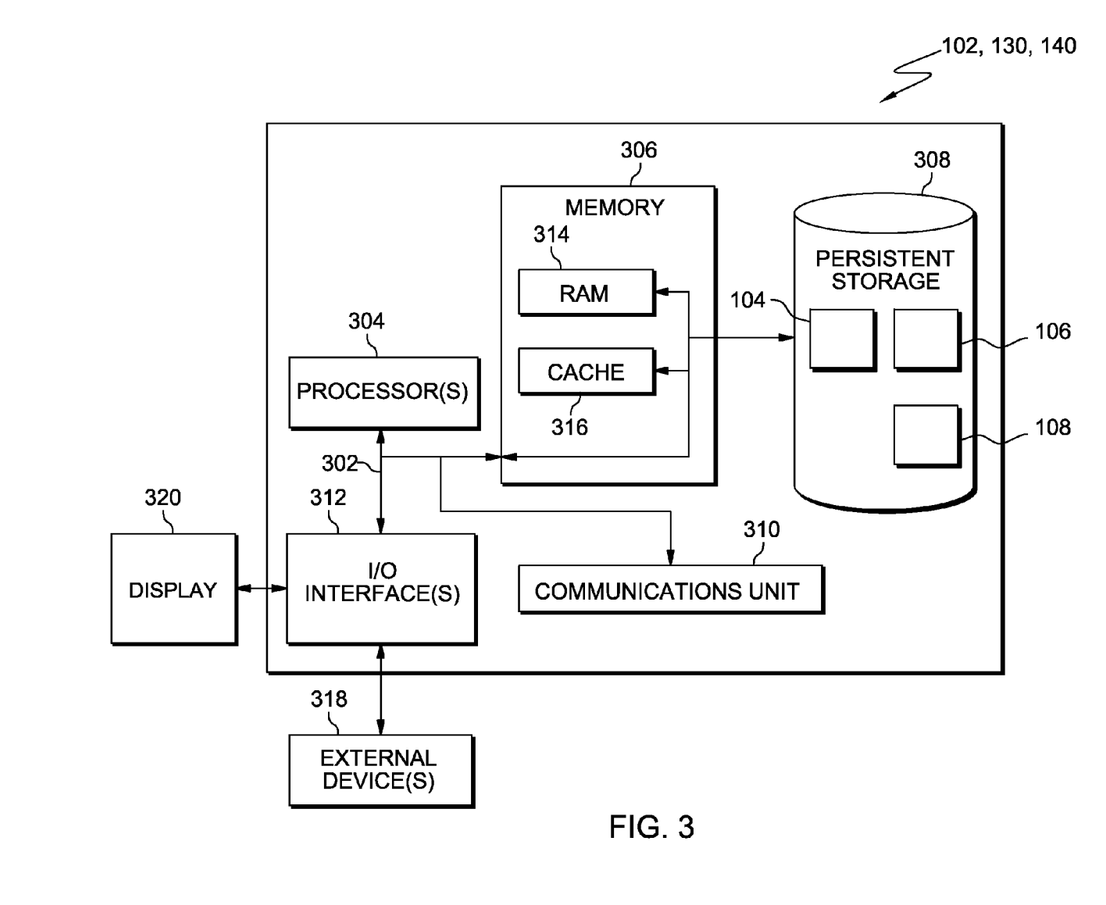
FIG. 3 is a block diagram of components of the computing device executing the modification program, in accordance with an embodiment of the present disclosure.

FIG. 3 depicts a block diagram, 300, of components of each of server computer 102, client device 130, and client device 140, respectively, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 102, client device 130, and client device 140 each respectively include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Modification program 104, social network program 106, and member database 108 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 3XX. In these examples, communications unit 310 includes one or more network interface cards. Communications unit 310 may provide communications through the use of either or both physical and wireless communications links. Modification program 104, social network program 106, and member database 108 of server computer 102, UI 132 of client device 130 (not shown in FIG. 3), and UI 142 of client device 140 (not shown in FIG. 3) may each respectively be downloaded to persistent storage 308 through communications unit 310.

I/O interface(s) 312 allows for input and output of data with other devices that may be connected to server computer 102, client device 130, or client device 140, respectively. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., modification program 104, social network program 106, and member database of server computer 102, UI 132 of client device 130 (not shown in FIG. 3), and UI 142 of client device 140 (not shown in FIG. 3) can each respectively be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The term(s) "Smalltalk" and the like may be subject to trademark rights in various jurisdictions throughout the world and are used here only in reference to the products or services properly denominated by the marks to the extent that such trademark rights may exist.

In another embodiment, the invention provides a method that performs the process of the invention on a subscription, advertising, and/or fee basis. That is, a service provider, such as a Solution Integrator, could offer to provide visual depiction modification functionality. In this case, the service provider can create, maintain, support, etc., a computer infrastructure, such as computer system 102 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for modifying a visual depiction. In this case, a computer infrastructure, such as computer system 102 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 102 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for modifying a visual depiction, the method comprising:
   identifying, by a processor, a first depiction of a first member of an online social network;
   determining, by the processor, a first date value representing a date corresponding to the first depiction;
   determining, by the processor, a relationship between the first member and a second member of the online social network;
   identifying, by the processor, a second date value based, at least in part, on the relationship between the first member and the second member;
   determining, by the processor, a region of the first depiction by performing facial recognition based, at least in part, on the first depiction;
   generating, by the processor, a second depiction by applying one or more operations to the region of the first depiction based, at least in part, on the second date value, wherein the second depiction allows identification of the first member based, at least in part, on the second date value; and
   generating, by the processor, a plurality of depictions by applying, by the processor, one or more operations to the region of the first depiction based, at least in part, on the second date value, wherein the plurality of depictions includes the second depiction, wherein each of the plurality of depictions allows identification of the second member based, at least in part, on a date value between the first date value and the second date value.

2. The method of claim 1, wherein the plurality of depictions depicts a chronological progression of an appearance of the first member.

3. The method of claim 1, wherein the first depiction includes at least one of a video image or an animated image.

4. The method of claim 1, further comprising:
   providing, by the processor, the second depiction in response to detecting, by the processor, that a mouse cursor has maintained position within a region defined by the first depiction for a pre-determined period of time.

5. The method of claim 1, wherein the plurality of depictions identifies a date corresponding to a third depiction of the plurality of depictions.

6. The method of claim 5, wherein the date corresponding to the third depiction is superimposed over the third depiction and at least one depiction of the plurality of depictions subsequent to the third depiction.

7. A computer program product for modifying a visual depiction, the computer program product comprising a computer readable storage medium having program instructions embodied therewith, the program instructions executable by a processor to cause the processor to perform a method comprising:
   identifying, by the processor, a first depiction of a first member of an online social network;
   determining, by the processor, a first date value representing a date corresponding to the first depiction;
   determining, by the processor, a relationship between the first member and a second member of the online social network;
   identifying, by the processor, a second date value based, at least in part, on the relationship between the first member and the second member;

determining, by the processor, a region of the first depiction by performing facial recognition based, at least in part, on the first depiction; and generating, by the processor, a second depiction by applying one or more operations to the region of the first depiction based, at least in part, on the second date value, wherein the second depiction allows identification of the first member based, at least in part, on the second date value; and generating, by the processor, a plurality of depictions by applying, by the processor, one or more operations to the region of the first depiction based, at least in part, on the second date value, wherein the plurality of depictions includes the second depiction, wherein each of the plurality of depictions allows identification of the second member based, at least in part, on a date value between the first date value and the second date value.

8. The computer program product of claim 7, wherein the plurality of depictions depicts a chronological progression of an appearance of the first member.

9. The computer program product of claim 7, wherein the first depiction includes at least one of a video image or an animated image.

10. The computer program product of claim 7, wherein the method further comprises:
providing, by the processor, the second depiction in response to detecting, by the processor, that a mouse cursor has maintained position within a region defined by the first depiction for a pre-determined period of time.

11. A computer system for modifying a visual depiction, the computer system comprising:
a memory; and
a processor in communication with the memory, wherein the computer system is configured to perform a method, said method comprising:
identifying, by the processor, a first depiction of a first member of an online social network;
determining, by the processor, a first date value representing a date corresponding to the first depiction;
determining, by the processor, a relationship between the first member and a second member of the online social network;
identifying, by the processor, a second date value based, at least in part, on the relationship between the first member and the second member;
determining, by the processor, a region of the first depiction by performing facial recognition based, at least in part, on the first depiction; and
generating, by the processor, a second depiction by applying one or more operations to the region of the first depiction based, at least in part, on the second date value, wherein the second depiction allows identification of the first member based, at least in part, on the second date value; and
generating, by the processor, a plurality of depictions by applying, by the processor, one or more operations to the region of the first depiction based, at least in part, on the second date value, wherein the plurality of depictions includes the second depiction, wherein each of the plurality of depictions allows identification of the second member based, at least in part, on a date value between the first date value and the second date value.

12. The computer system of claim 11, wherein the plurality of depictions depicts a chronological progression of an appearance of the first member.

13. The computer system of claim 11, wherein the first depiction includes at least one of a video image or an animated image.

14. The computer system of claim 11, wherein the method further comprises:
providing, by the processor, the second depiction in response to detecting, by the processor, that a mouse cursor has maintained position within a region defined by the first depiction for a pre-determined period of time.

* * * * *